(12) United States Patent
Xia et al.

(10) Patent No.: US 10,897,287 B2
(45) Date of Patent: Jan. 19, 2021

(54) SYSTEM AND METHOD FOR SPATIAL QUASI-CO-LOCATION (SQCL) SIMILAR ANGLE PRECODING (SAP)

(71) Applicant: FutureWei Technologies, Inc., Plano, TX (US)

(72) Inventors: Pengfei Xia, San Diego, CA (US); Bin Liu, San Diego, CA (US); Richard Stirling-Gallacher, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 67 days.

(21) Appl. No.: 15/718,924

(22) Filed: Sep. 28, 2017

(65) Prior Publication Data

US 2018/0331735 A1 Nov. 15, 2018

Related U.S. Application Data

(60) Provisional application No. 62/506,380, filed on May 15, 2017.

(51) Int. Cl.
*H04B 7/0408* (2017.01)
*H04B 7/0456* (2017.01)
(Continued)

(52) U.S. Cl.
CPC ......... *H04B 7/0456* (2013.01); *H04B 7/0408* (2013.01); *H04B 7/15578* (2013.01);
(Continued)

(58) Field of Classification Search
CPC ............. H04B 7/0456; H04B 7/0408; H04B 7/15578; H04L 5/0053; H04L 5/005; H04L 5/0051; H04L 5/0023; H04L 5/02
See application file for complete search history.

(56) References Cited

U.S. PATENT DOCUMENTS

2014/0036804 A1\* 2/2014 Chen ............... H04L 5/0053
370/329
2015/0282133 A1 10/2015 Kakishima et al.
(Continued)

FOREIGN PATENT DOCUMENTS

CN 105308889 A 2/2016
WO 2015020237 A1 2/2015

OTHER PUBLICATIONS

Ericsson, "On QCL for DL RS and on spatial QCL definition", 3GPP TSG-RAN WG1 #88, R1-1702692, Athens, Greece, Feb. 13-17, 2017, 4 pages.
(Continued)

*Primary Examiner* — Moo Jeong
(74) *Attorney, Agent, or Firm* — Slater Matsil, LLP

(57) ABSTRACT

A method includes inserting a first reference signal and a plurality of bit fields on a first channel, to produce a first signal, where the plurality of bit fields includes a first bit field indicating whether a second reference signal is transmitted on a second channel, a second bit field indicating whether the first reference signal has the same precoding as the second reference signal, a third bit field indicating whether precoding of the first reference signal is similar to precoding of the second reference signal, or a fourth bit field indicating transmission precoding differences between the first reference signal and the second reference signal. The method also includes performing precoding on the first signal, to produce a first transmission signal, performing precoding on the second channel, to produce a second transmission signal, transmitting, to a receiver, the first transmission signal and transmitting, to the receiver, the second transmission signal.

28 Claims, 5 Drawing Sheets

(51) Int. Cl.
　　　 *H04B 7/155* 　 (2006.01)
　　　 *H04L 5/00* 　　 (2006.01)
　　　 *H04L 5/02* 　　 (2006.01)

(52) U.S. Cl.
　　　 CPC ............ *H04L 5/005* (2013.01); *H04L 5/0051*
　　　　　　　 (2013.01); *H04L 5/0053* (2013.01); *H04L*
　　　　　　　　　 *5/0023* (2013.01); *H04L 5/02* (2013.01)

(56) References Cited

U.S. PATENT DOCUMENTS

| | | | |
|---|---|---|---|
| 2016/0119936 A1 | 4/2016 | Kim et al. | |
| 2016/0212738 A1* | 7/2016 | Thurfjell | G01S 1/44 |
| 2018/0131492 A1* | 5/2018 | John Wilson | H04L 5/0053 |
| 2018/0227886 A1* | 8/2018 | Chou | H04W 72/046 |
| 2018/0269950 A1* | 9/2018 | John Wilson | H04L 5/0053 |

OTHER PUBLICATIONS

Raghavendra Devareddy, "LTE-Advanced", http://raghudevareddy-lte-a.blogspot.com/2014/02/lte-coordinated-multi-...2, Feb. 17, 2014, 9 pages.

Interdigital. Inc., "On Beam Management for DL Control and Data Channels", 3GPP TSG RAN WG1 Meeting #89, R1-1708334, May 15-19, 2017, 4 Pages, Hangzhou, P.R. China.

ZTE, "QCL/QCB design for NR MIMO", 3GPP TSG RAN WG1 Meeting #89, R1-1707134, 9 pages, May 15-19 2017, Hangzhou, P.R. China.

* cited by examiner

SYSTEM AND METHOD FOR SPATIAL QUASI-CO-LOCATION (SQCL) SIMILAR ANGLE PRECODING (SAP)

PRIORITY CLAIM

This application claims the benefit of U.S. Provisional Application No. 62/506,380, filed on May 15, 2017, entitled "System and Method for Spatial Quasi-Co-Location (SQCL) and Similar Angle Precoding (SAP)," which application is hereby incorporated by reference in its entirety.

TECHNICAL FIELD

The present disclosure relates generally to a system and method for wireless communications, and, in particular embodiments, to a system and method for similar angle precoding (SAP).

BACKGROUND

In Long Term Evolution (LTE), common reference signals (CRS) are used for cell search and initial acquisition, downlink channel estimation for demodulation, and downlink channel quality measurements. However, new radio (NR) does not use a CRS. In NR, demodulation reference signals are used by control channels for decoding control channel messages, and by data channels for decoding the data channel messages.

SUMMARY

According to one aspect of the present disclose, there is provided a method implemented by a transmitter, the method includes inserting a first reference signal and a plurality of bit fields on a first channel, to produce a first signal, where the plurality of bit fields includes a first bit field indicating whether a second reference signal is transmitted on a second channel, a second bit field indicating whether the first reference signal has the same precoding as the second reference signal, a third bit field indicating whether precoding of the first reference signal is similar to precoding of the second reference signal, or a fourth bit field indicating transmission precoding differences between the first reference signal and the second reference signal. The method also includes performing precoding on the first signal, to produce a first transmission signal and performing precoding on the second channel, to produce a second transmission signal. Additionally, the method includes transmitting, to a receiver, the first transmission signal and transmitting, to the receiver, the second transmission signal.

Optionally, in any of the preceding aspects, another implementation of the aspect provides that the first reference signal is a reference signal for control channel (RSC), the first channel is a control channel, the first signal is a control signal, the second reference signal is a reference signal for data channel (RSD), and the second channel is a data channel.

Optionally, in any of the preceding aspects, another implementation further includes inserting a second RSC and a second plurality of bit fields on a second control channel, to produce a second control signal, where the second plurality of bit fields indicates a precoding relationship between the second RSC and the RSD, performing precoding on the second control signal, to produce a third transmission signal, and transmitting, by the transmitter to the receiver, the third transmission signal.

Optionally, in any of the preceding aspects, another implementation of the aspect provides that the first reference signal is a channel state information reference signal (SCI-RS), a synchronization signal (SS), a sounding reference signal (DRS), a demodulation reference signal (DMRS), or a data channel signal, and the second reference signal is a CSI-RS, an SS, an SRS, a DMRS, or a control channel signal.

Optionally, in any of the preceding aspects, another implementation of the aspect provides that the plurality of bit fields includes the first bit field, the second bit field, the third bit field, and the fourth bit field.

Optionally, in any of the preceding aspects, another implementation of the aspect provides that the fourth bit field includes a first parameter indicating a difference in transmission precoding gain between the first reference signal and the second reference signal, a second parameter indicating a difference in transmission precoding phase between the first reference signal and the second reference signal, or a third parameter indicating a difference in transmission precoding center angle between the first reference signal and the second reference signal.

Optionally, in any of the preceding aspects, another implementation of the aspect provides that the first parameter indicates to the receiver adjustments for receiving the first reference signal and the second reference signal with different precoding gains, where the second parameter indicates to the receiver adjustments for receiving the first reference signal and the second reference signal with different phases, and where the third parameter indicates to the receiver adjustments for receiving the first reference signal and the second reference signal with different center angles.

Optionally, in any of the preceding aspects, another implementation of the aspect provides that the second bit field indicates to the receiver similarities for receiving the first reference signal and the second reference signal, where the third bit field indicates to the receiver similarities for receiving the first reference signal and the second reference signal, and where the fourth bit field indicates to the receiver differences for receiving the first reference signal and the second reference signal.

Optionally, in any of the preceding aspects, another implementation of the aspect provides that the first channel further includes additional signaling instructing the receiver regarding receiving the second channel.

Optionally, in any of the preceding aspects, another implementation of the aspect provides that a user equipment (UE) and the receiver is a communications controller.

Optionally, in any of the preceding aspects, another implementation of the aspect provides that the transmitter is a communications controller and the receiver is a UE.

According to another aspect of the present disclose, there is provided a method implemented by a receiver, the method including receiving, from a transmitter, a first channel on a first received signal, the first channel including a first reference signal and demodulating the first channel based on the first reference signal, to produce a demodulated first channel message. The method also includes extracting a plurality of bit fields from the demodulated first channel message, where the plurality of bit fields includes a first bit field indicating whether the first reference signal has the same precoding as a second reference signal of a second channel message corresponding to the first channel, a second bit field indicating whether the first reference signal has precoding similar to precoding of the second reference signal, or a third bit field including a plurality of parameters indicating transmission precoding differences between the first reference signal and the second reference signal.

Optionally, in any of the preceding aspects, another implementation of the aspect includes performing filtering on the first received signal based on the first bit field indicating that the first reference signal has precoding similar to precoding of the second reference signal, and based on the plurality of parameters, to produce a filtered first reference signal receiving, from the transmitter, a second channel on a second received signal, obtaining channel estimates based on the second reference signal and based on the filtered first reference signal, and demodulating the second channel based on the channel estimates, to produce a channel message.

Optionally, in any of the preceding aspects, another implementation of the aspect provides that the plurality of bit fields further includes a fourth bit field indicating whether the second reference signal is present on the second channel.

Optionally, in any of the preceding aspects, another implementation of the aspect provides that the first channel further includes additional signaling instructing the receiver regarding receiving the second channel.

Optionally, in any of the preceding aspects, another implementation of the aspect provides that the first reference signal is an RSC channel, the first channel is a control channel, the first reference signal is a control signal, and the second reference signal is an RSD.

Optionally, in any of the preceding aspects, another implementation of the aspect includes receiving, by the receiver from the transmitter, a second control channel on a third received signal, the second control channel including a second RSC and demodulating the second control channel based on the second RSC, to produce a second demodulated control channel message. The method also includes extracting a second plurality of bit fields from the second demodulated control channel message and performing filtering on the second control channel based on the plurality of bit fields, to produce a second filtered RSC signal, where obtaining the RSD is further performed in accordance with the second filtered RSC signal.

Optionally, in any of the preceding aspects, another implementation of the aspect provides that the plurality of bit fields includes the first bit field, the second bit field, and the third bit field.

Optionally, in any of the preceding aspects, another implementation of the aspect provides that the plurality of parameters includes a first parameter indicating a difference in transmission precoding gain between the first reference signal and the second reference signal, a second parameter indicating a difference in transmission precoding center angle between the first reference signal and the second reference signal, or a third parameter indicating a difference in transmission precoding phase between the first reference signal and the second reference signal.

According to another aspect of the present disclose, there is provided a transmitter including a memory storage including instructions and one or more processors in communication with the memory. The one or more processors execute the instructions to insert a first reference signal and a plurality of bit fields on a first channel, to produce a first signal, where the plurality of bit fields includes a first bit field indicating whether a second reference signal is transmitted on a second channel, a second bit field indicating whether the first reference signal has the same precoding as the second reference signal, a third bit field indicating whether precoding of the first reference signal is similar to precoding of the second reference signal, or a fourth bit field indicating transmission precoding differences between the first reference signal and the second reference signal. The one or more processors also execute the instructions to perform precoding on the first signal, to produce a first transmission signal and perform precoding on the second channel, to produce a second transmission signal. Additionally, the one or more processors insert the instructions to transmit, to a receiver, the first transmission signal and transmit, to the receiver, the second transmission signal.

The foregoing has outlined rather broadly the features of an embodiment of the present disclosure in order that the detailed description of the embodiments that follows may be better understood. Additional features and advantages of embodiments of the disclosure will be described hereinafter, which form the subject of the claims. It should be appreciated by those skilled in the art that the conception and specific embodiments disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

An embodiment uses bit fields of a control channel to indicate a precoding relationship, such as similar angle precoding (SAP), between control channels and data channels. A reference signal for control channel (RSC) may be in a SAP relationship with a reference signal for data channel (RSD). In some embodiments, there is a SAP relationship between the control channel message and the data channel message. Also, in some embodiments, bit fields in a control channel indicate, to a receiver, the precoding relationship between an RSC and a data channel. The receiver may then perform filtering on the RSC to assist in receiving the RSD.

Figure 1:
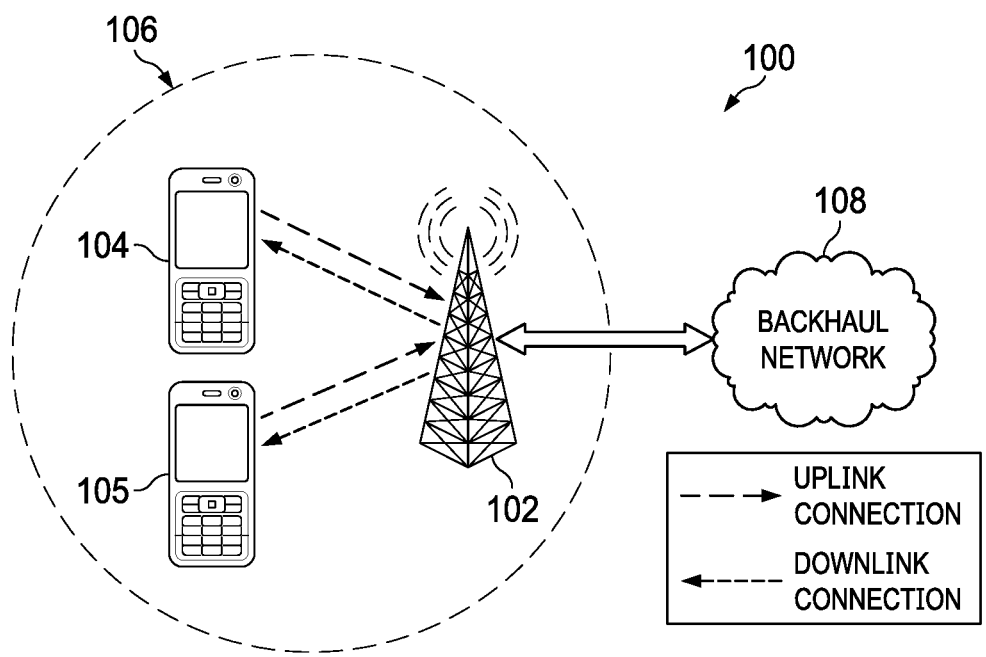
FIG. 1 illustrates a diagram of a wireless network for communicating data associated with some embodiments.

FIG. 1 illustrates a network 100 for communicating data according to some embodiments. The network 100 includes the communications controller 102 having a coverage area 106, a plurality of user equipments (UEs), including the UE 104 and the UE 105, and the backhaul network 108. In this embodiment, two UEs are depicted, but many more may be present. The communications controller 102 may be any component capable of providing wireless access by establishing uplink (dashed line) and/or downlink (dotted line) connections with the UE 104 and the UE 105, such as a base station, a NodeB, an enhanced nodeB (eNB), an access point, a picocell, a femtocell, relay node, and other wirelessly enabled devices. Uplink data transmission may be grant based or grant free. The UE 104 and the UE 105 may be any component capable of establishing a wireless connection with the communications controller 102, such as UEs, cell phones, smart phones, tablets, sensors, or the like. The backhaul network 108 may be any component or collection of components that allow data to be exchanged between communications controller 102 and a remote end. In some embodiments, the network 100 may include various other wireless devices, such as relays, low power nodes (LPNs) or the like.

Two or more beams, for example reference signal beams, may be quasi co-located (QCL). QCL beams share some precoding characteristics, for example carrier frequency, time offset, or frequency offset. When signals are known to be QCL, and the precoding characteristics of one beam are known, the corresponding precoding characteristics of the other beam may be determined. For an RSC and an RSD that have a carrier frequency offset QCL relationship, the frequency offset estimated based on the RSC can be used for the RSD. One type of QCL is spatial QCL (SQCL). In SQCL, two signals are precoded using the same precoder, and the corresponding beams are the same.

Figure 2A:
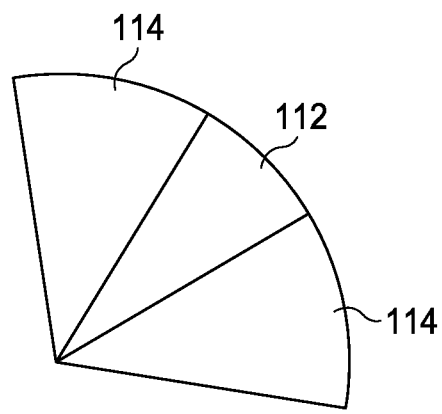
FIGS. 2A-C illustrate embodiment beams for similar angle precoding (SAP)
Figure 2B:
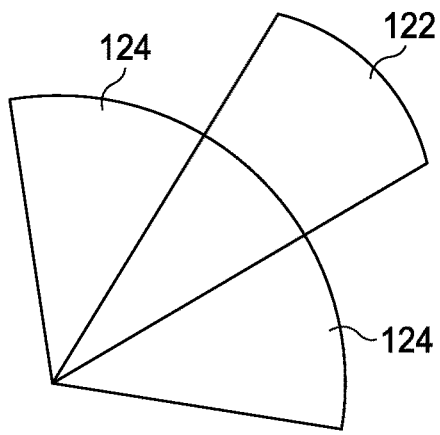
Figure 2C:
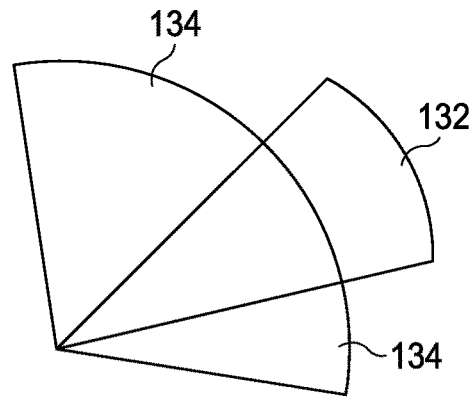

In SAP, similar, or related, but not identical, precoding is used for the signals, so the beams share some characteristics, but are not identical. FIGS. 2A-C illustrate three types of SAP. In FIG. 2A, two precoding vectors have the same gain and are pointing in the same directions, but have different widths. The beam 112 and the beam 114 are pointing in the same direction and have the same gain, and hence the same power. However, the beam 114 is wider than the beam 112. For example, the beam 114 is pointing in a direction ranging from 30 degrees to 50 degrees, while the beam 112 is pointing in a direction ranging from 35 degrees to 45 degrees.

In the embodiment illustrated by FIG. 2B, two precoding vectors are pointing in the same direction, but have different widths and different gains. The beam 122 and the beam 124 are pointing in the same direction. However, the beam 122 is narrower than the beam 124. Additionally, the beam 122 has a higher gain, and hence higher power, than beam 124. For example, the beam 124 is pointing in a direction ranging from 30 to 50 degrees with a 10 dB gain, and the beam 122 is pointing in a direction ranging 35 to 45 degrees with a 15 dB gain.

In the embodiment illustrated by FIG. 2C, two precoding vectors are pointing in overlapping directions, but with different widths, gains, and center angles. The beam 132 and the beam 134 are pointing in similar directions, but the center of the beam 132 is offset from the center of the beam 134. Additionally, the beam 132 is narrower than the beam 134, and the beam 132 has a higher gain than the beam 134. In one example, the beam 134 is pointing in a direction ranging from 30 degrees to 50 degrees, with a 10 dB gain, and the beam 132 is pointing in a direction ranging from 35 degrees to 40 degrees, with a 15 dB gain.

In an additional embodiment, two precoding vectors have the same gains, but different center angles and different widths. In an embodiment, the narrower beam has a lower gain than the wider beam.

In another type of SAP, one beam has a phase offset relative to the other beam. This may be combined with any of the other types of SAP.

In new radio (NR), demodulation reference signals are used for control channels and for data channels. An RSC is used to assist receivers in demodulating control channels. Because the RSC may be destined for a large group of users or for a small group of users, a wider angle precoding may be used for transmitting the RSC. An RSC generally has a high level of reliability. An RSD is used so receivers may demodulate data channel messages. Because the RSD is typically destined for a small group of users, narrower angle precoding may be used for transmitting the RSD. Also, the RSD generally has a higher throughput than the RSC, and may be less reliable than the RSC.

In an embodiment, there is a SAP relationship between an RSC and a corresponding RSD. The RSC may be precoded using a wider precoder with lower power, and the RSD may be precoded using a narrower precoder with a higher power. The RSC may be used in addition to the RSD to assist the receiver in data channel estimation and demodulation. In an embodiment, a control region includes information on the precoding relationship, for example the SAP relationship, between the RSC and the corresponding RSD or data channel.

In some embodiments of SAP, the wider beam and the narrower beam, after filtering, share the angle of arrival (AOA) and the angle of departure (AOD). The AOA and AOD may be extracted from the filtered RSC alone, or from the filtered RSD alone. The AOA and AOD of the RSC may be used to improve the accuracy of determining the AOA and the AOD of the RSD. Algorithms such as multiple sidelobe canceller (MSC), linearly constrained minimum variance (LCMV), and minimum variance distortionless response (MVDR) may be used. In another embodiment, the AOA and AOD of the RSD are used to improve the accuracy of determining the AOA and AOD of the RSC.

Figure 3:
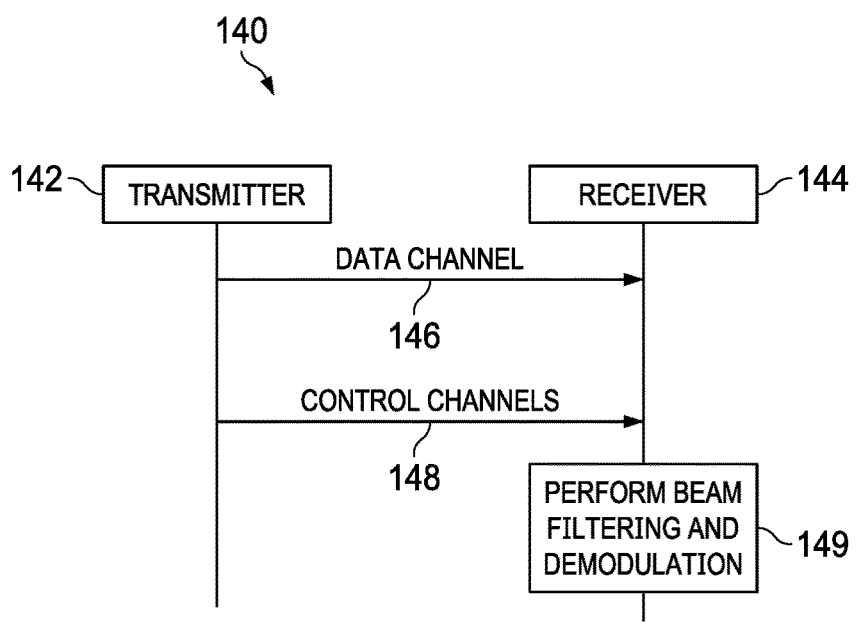
FIG. 3 illustrates a message diagram for an embodiment method of SAP beam coordination.

FIG. 3 illustrates the message diagram 140 for an embodiment method of SAP beam coordination. The transmitter 142 transmits a transmission including a data channel and one or more corresponding control channels to the receiver 144. In one embodiment, the transmission is an uplink transmission, the transmitter 142 is a UE, and the receiver 144 is a communications controller. Alternatively, the communications transmission is a downlink transmission, the transmitter 142 is a communications controller, and the receiver 144 is a UE. The data channel 146 and the control channels 148 are transmitted from the transmitter 142 to the receiver 144. The control channels 148 may be one, two, three, or more communications channels corresponding to the data channel 146. The data channel 146 and the control channels 148 are transmitted on similar, but not identical, time and frequency resources.

The receiver 144 performs beam filtering and demodulation on the received data channel and control channels in the block 149. The control channel contains an RSC which assists with demodulation of the control channel. The control channel may also include fields which indicate a relationship between precoding of the RSC and the data channel. In an example, the bit fields in the control channel indicate whether an RSD is present in the data channel, whether the RSC is in a SQCL relationship with the RSD, whether the RSC is in a SAP relationship with the RSC, and additional information on the differences in transmission precoding between the RSD and the RSD. The additional information may include the difference in transmission precoding gain between the RSC and the RSD, the precoding center angle between the RSC and the RSD, the difference in transmission precoding angle spread of the RSC and the RSD, and the difference in transmission precoding phase between the RSC and the RSD. Filtering on the RSC may be used to assist with determining the AOA and AOD of the RSD to improve reception of the RSD. Then, the RSD is used to demodulate the data channel.

Figure 4:
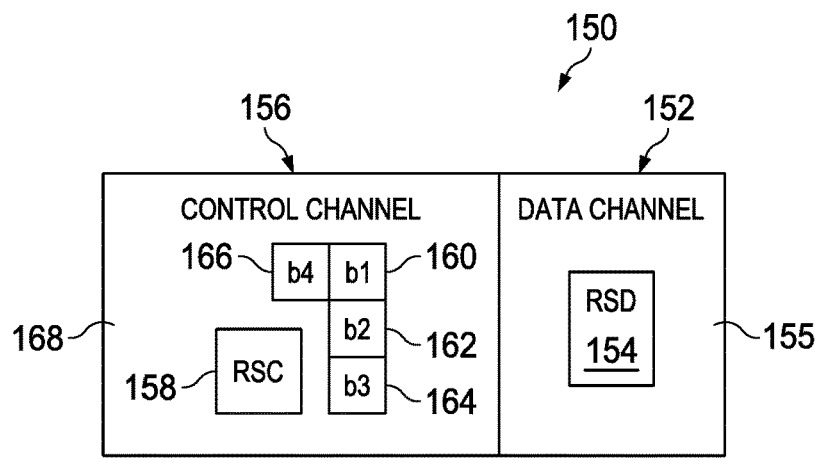
FIG. 4 illustrates an embodiment frame.

Uplink and downlink communication frames may include one or more control channels and one or more data channels. FIG. 4 illustrates the communication frame 150 with one data channel 152 and one control channel 156. The data channel 152 and the control channel 156 are sent on nearby, but not necessarily adjacent, time and frequency resources. The control channel 156 includes the RSC 158, the bit fields 160, 162, 164, and 166, and other control channel information 168. Four bit fields 160, 162, 164, and 166 are pictured, but more or fewer bit fields may present. The RSD 154 is used to demodulate the bit fields 160, 162, 164, and 166, as well as the other control channel information 168. After the bit fields 160, 162, 164, and 166 are demodulated, they are used to perform filtering on the RSC 158. The filtered version of the RSC 158 may be used to determine its AOA and AOD, which may be the same as the AOA and AOD for the RSD 154. The data channel 152 includes the RSD 154 and the message data 155. The RSD 154 is used by the receiver to demodulate the message data 155.

Figure 5:
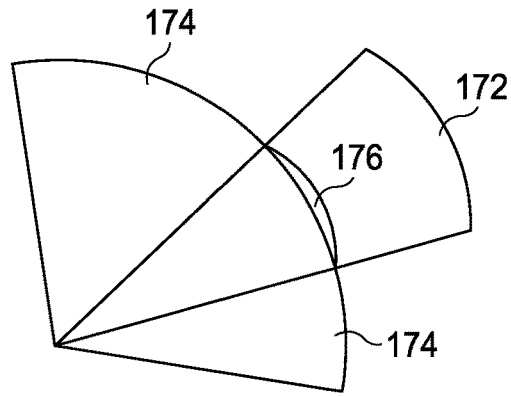
FIG. 5 illustrates embodiment beams for SAP beam coordination.

FIG. 5 illustrates an embodiment method of filtering a received beam to assist with receiving beams having a SAP relationship. The beam 174 is an RSC and the beam 172 is an RSD. The beam 174 and the beam 172 have different gains, different widths, and different centers, but they have overlapping angles. Also, the beam 172 and the beam 174 may have different phases, or they may have the same phase. The beam 174 is filtered to obtain the beam 176. Then, the beam 176 is used to assist in channel estimation or equalization for the beam 172. For the receiver to perform filtering on the beam 174, the transmitter signals indicators of the relationship between the precoding for the beam 174 and for the beam 176, for example the difference in transmission precoding gain between the RSC and the RSD, the difference in transmission precoding center angle between the RSC and the RSD, the difference in transmission precoding angular spread between the RSC and the RSD, and the difference in transmission precoding phase between the RSC and the RSD. The difference in transmission precoding gain may also be used to assist in receiver side automatic gain control (AGC) tuning.

The bit fields illustrated in FIG. 4 may convey information about the relationship between the precoding of the RSC 158 and the precoding of the data channel 152 to a receiver. In an embodiment, the bit field 160 indicates whether the RSD 154 is included in the data channel 152. In some circumstances, the RSD 154 is not transmitted. For example, the RSD 154 is not transmitted when the control channel 156 and the data channel 152 are destined for the same group of users, when the same precoding is used for the RSC 158 and the data channel 152, or when the time separation between the control channel 156 and the data channel 152 is sufficiently small for the speed of movement of the UE and the frequency separation is sufficiently small for the bandwidth of the channel. In one embodiment, the bit field 160 has a value of 1 to indicate that the RSD 154 is not transmitted and a value of 0 to indicate that the RSD 154 is transmitted. Alternatively, the bit field 160 has a value of 0 to indicate that the RSD 154 is not transmitted and a value of 1 to indicate that the RSD 154 is transmitted. When the RSD 154 is transmitted, the receiver may use the RSD 154 to perform data channel demodulation, and other bit fields indicate whether the receiver may use the RSC 158 for data channel demodulation. On the other hand, when the RSD 154 is not transmitted, the receiver is instructed to use the RSC 158 to perform data channel demodulation. When the RSD 154 is not transmitted, the RSC is in a SQCL relationship with the data channel 152. Additional signaling is not used in some circumstances, for example when the RSC 158 is the latest in time and the closest in the frequency domain. Additional signaling is used in other circumstances, for example when the RSC 158 is not the latest in time and the closest in the frequency domain. The additional signaling may indicate the time and/or frequency of the RSC 158.

The bit field 162 indicates whether the RSD 154 is in an SQCL relationship with the RSC 158. When the RSD 154 is in an SQCL relationship with the RSC 158, the same precoding is applied for both the RSC 158 and the RSD 154. In one embodiment, a value of 0 for the bit field 162 indicates that different precoding is applied to the RSC 158 and to the RSD 154, and a bit value of 1 indicates that the same precoding is used for the RSC 158 and the RSD 154. Alternatively, a value of 1 for the bit field 162 indicates that different precoding is applied to the RSC 158 and to the RSD 154, and a bit value of 0 indicates that the same precoding is used for the RSC 158 and for the RSD 154. When the same precoding is applied to the RSC 158 and to the RSD 154, the receiver is instructed not to use the RSC 158 in performing data channel demodulation of the data channel 152, and to only use the RSD 154. On the other hand, when different precoding is applied to the RSC 158 and the RSD 154, the receiver is instructed to use both the RSC 158 and the RSD 154 to perform data channel demodulation on the data channel 152. Also, both the RSC 158 and the RSD 154 may be used to perform control channel demodulation when the RSC 158 and the RSD 154 have an SQCL relationship. In one example, the receiver estimates the channel to be h1 based on the RSC 158, and estimates the channel to be h2 based on the RSD 154. The receiver averages h1 and h2 to obtain a more accurate channel estimate.

The bit field 164 indicates whether the RSD 154 is in a SAP relationship with the RSC 158. In one example, a value of 0 for the bit field 164 indicates that different precoding is used for the RSD 154 and for the RSC 158, and a value of 1 indicates that the RSC 158 and the RSD 154 have a SAP relationship. Alternatively, a value of 1 for the bit field 164 indicates that different precoding is used for the RSD 154 and for the RSC 158, and a value of 0 indicates that the RSC 158 and the RSD 154 have a SAP relationship. When different precoding is used for the RSC 158 and the RSD 154, the receiver is instructed to not use the RSC 158 in performing demodulation of the data channel 152, and to only use the RSD 154. On the other hand, when the RSC 158 and the RSD 154 have a SAP relationship, the receiver may use both the RSC 158 and the RSD 154 to perform data channel demodulation of the data channel 152. Additionally, when the bit field 164 indicates that the RSC 158 and the RSD 154 have a SAP relationship, the bit field 166 may provide additional information on filtering that may be performed by the receiver on the RSC 158 to assist the RSD in demodulation the data channel 152, to improve channel quality estimation.

The bit field 166 may indicate the relationship between the precoding of the RSC 158 and the precoding of the RSD 154. The bit field 166 may indicate the difference in transmission precoding gain between the RSC 158 and the RSD 154, the difference in transmission precoding center angle between the RSC 158 and the RSD 154, the difference in transmission precoding angle width between the RSC 158 and the RSD 154, and the difference in transmission precoding phase between the RSC 158 and the RSD 154. In some embodiments, multiple bit fields are used to indicate the relationship of multiple characteristics of the precoding of the RSC 158 and the precoding of the RSD 154.

Based on the bit fields 160, 162, 164, and 166, the receiver performs signal processing algorithms, for example time domain filtering, to obtain a filtered version of the RSC 158. The receiver may then combine the filtered version of the RSC with the RSD 154. The RSD 154 may also be filtered. Algorithms such as MSC, LCMV, and MVDR may be used for filtering. The filtered beams may then be used determine the AOA and AOD of the beams, and to assist in receiving the beams.

Figure 6:
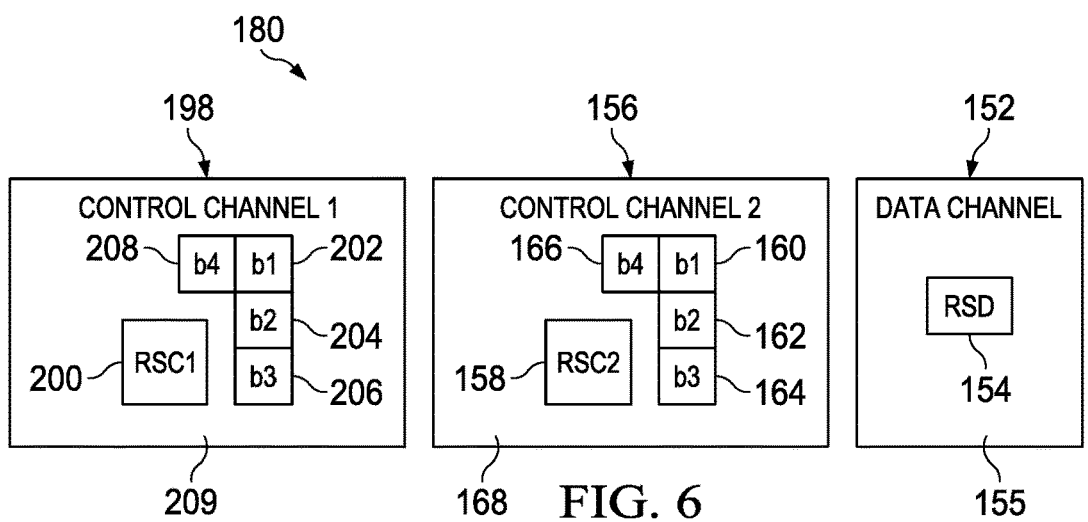
FIG. 6 illustrates another embodiment frame.

An uplink or downlink transmission may include multiple data channels and/or multiple control channels. For example, FIG. 6 illustrates the communications frame 180 with one data channel 152 and two control channels 156 and 198. The control channel 198 contains the RSC 200, the bit fields 202, 204, 206, and 208, and the additional control channel information 209. In one embodiment, the control channel 156 and the control channel 198 contain the same information. Alternatively, the control channel 198 and the control channel 156 contain different information. In one example, the RSC 200 is precoded differently than the RSC 158. Alternatively, the RSC 200 is precoded the same as the RSC 158. In an additional example, the RSC 200 and the RSC 158 are precoded in a similar, but not identical, manner. The RSC 158 is used to demodulate the control channel 156, and the RSC 200 is used to demodulate the control channel 198. Also, the RSD 154 is used by the receiver to demodulate the data channel 152.

The bit field 164 may include the difference in transmission precoding gain between the RSC 158 and the RSD 154, the difference in transmission precoding center angle between the RSC 158 and the RSD 154, the difference in transmission precoding angular width between the RSC 158 and the RSD 154, and the difference in transmission precoding phase between the RSC 158 and the RSC 158. Likewise, the bit field 208 may include the precoding gain difference between the RSC 200 and the RSD 154, the difference in transmission precoding center angle between the RSC 200 and the RSD 154, the difference in transmission precoding angular width between the RSC 200 and the RSD 154, and the difference in transmission precoding phase between the RSC 200 and the RSD 154. The receiver may perform signal processing algorithms, such as time domain filtering, on the RSC 200 and the RSC 158. Then, the receiver may combine the filtered versions of the RSC 200 and the RSC 158, which may be combined with the RSD, which may also be filtered, to better receive the data channel 152.

Embodiments provide various advantages. For examples, the use of control channel bit fields to indicate a SAP relationship between an RSD and an RSC may reduce reference signal overhead. Additionally, the use of control channel bit fields to convey differences in transmission precoding between an RSD and an RSC may improve channel estimation performance, and hence demodulation performance and decoding performance.

Figure 7:
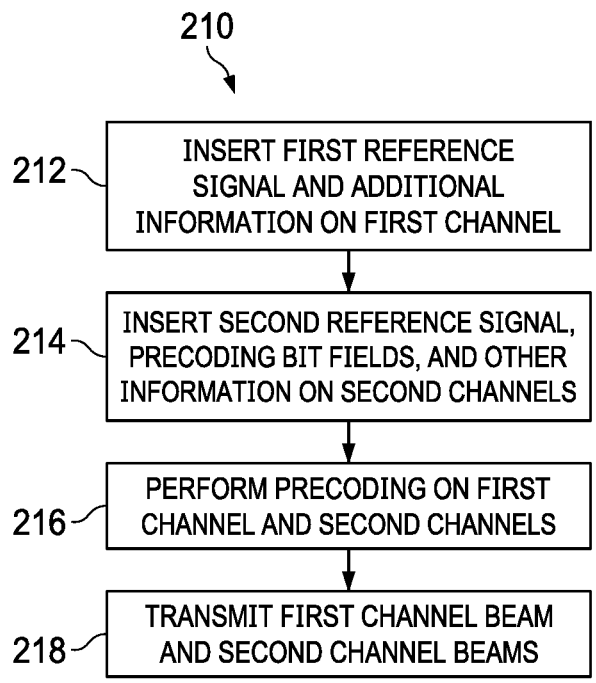
FIG. 7 illustrates a flowchart for an embodiment method of SAP beam coordination performed by a transmitter.

FIG. 7 illustrates the flowchart 210 for an embodiment method of SAP beam coordination performed by a transmitter. In one example, uplink transmission is performed, and the transmitter is a UE. In another example, downlink transmission is performed, and the transmitter is a communications controller. In the block 212, the transmitter inserts a first reference signal on a first channel. In one embodiment, the first reference signal is an RSD and the first channel is a data channel. In another embodiment, the first reference signal is a channel state information reference signal (CSI-RS), a synchronization signal (SS), a sounding reference signal (SRS), a demodulation reference signal (DMRS), or a control channel signal. In some embodiments, an RSD is not added to the first channel. Additionally, the transmitter inserts data or other information on the first channel.

In the block 214, the transmitter inserts a second reference signal, bit fields, and other information, on one or more second channels. In one example, the second channels are control channels, the second reference signal is an RSC, and the other information is other control information. In another embodiment, the second reference signal is a CSI-RS, an SS, an SRS, a DMRS, or a data channel signal. The transmitter may insert an RSC and bit fields to each RSC. The same RSC may be used for multiple control channels corresponding to the same data channel. Alternatively, a different RSC is used for multiple control channels. In some embodiments, the bit fields are the same for all control channels. In other embodiments, some of the bit fields are the same and some of the bit fields are different for the multiple control fields. In additional embodiments, all of the bit fields are different for the different control channels. In one example, four bit fields are inserted on the control channel, indicating the precoding relationship between the RSC and the corresponding data channel. The first bit field indicates whether an RSD is present on the data channel. In one embodiment, a value of 1 indicates the presence of an RSD and a value of 0 indicates the absence of an RSD. When an RSD is not present on the data channel, the RSC will be SQCL with the data channel. In some circumstances, additional signaling is inserted on the control channel, for example when the RSC is not the latest in time and the closest in frequency domain. In other circumstances, for example when the RSC is the latest in time and closest in frequency compared to the data channel, no extra signaling is used. On the other hand, when the first bit field indicates that an RSD is present on the RSD, the RSD can be used in demodulating the data channel, possibly in combination with the RSC, and other bit fields. When multiple control channels are used, the first bit field will be the same for the multiple control channels corresponding to the same data channel.

The second bit field indicates whether an RSD is in an SQCL relationship with the RSC. In one embodiment, a value of 1 indicates that the same precoding is used for the RSC and the RSD, and a value of 0 indicates that different precoding is used for the RSC and for the RSD. When different precoding is used for the RSC and for the RSD, the receiver is instructed to not use the RSC to perform data channel demodulation. On the other hand, when the same precoding is used for the RSD and the RSC, the receiver can use both the RSC and the RSD to perform data channel demodulation. Additionally, when the RSC and the RSD are in an SQCL relationship, the receiver can use both the RSC and the RSD to perform control channel demodulation. When the same precoding is used for the RSCs of multiple control channels, the second bit field for the multiple control channels will be the same. When the same precoding is used for the RSD and the RSC, the receiver is instructed to use similar methods to receive the RSD and the RSC. Alternatively, when different precoding is used for the precoding of the RSCs of multiple control channels, the second bit field will be different for the multiple control channels.

The third bit field indicates whether the RSD is in a SAP relationship with the RSC. When the RSD is in a SAP relationship with the RSC, the receiver is instructed to use similar methods for receiving the RSD and the RSC. In one embodiment, a value of 1 indicates that the RSC is in a SAP relationship with the RSD, and a value of 0 indicates that the RSC is not in a SAP relationship with the RSD. When the RSD and the RSC are not in a SAP relationship, and the RSD and RSC have entirely different precoding, the receiver is informed to not use the RSC to perform data channel demodulation. On the other hand, when the RSC and the RSD are in a SAP relationship, the receiver is informed that it may use the RSC to perform data channel demodulation. When multiple control channels corresponding to the data channel have RSCs with a SAP relationship with the RSD, the third bit field will be the same. Similarly, when none of the control channels have RSCs with a SAP relationship with the RSD, the third bit field will be the same. However, when some but not all of the control channels have RSCs with a SAP relationship with the RSD, the third bit field will be different.

The fourth bit field provides detailed information on the relationship between the precoding of the RSC and the precoding of the RSD. The indicator of the differences in the precoding of the RSC and the RSD indicates to the receiver differences for receiving the RSD and the RSC. The fourth bit field may include multiple parameters indicating the difference in the transmission precoding gain between the RSC and the RSD, the difference in the transmission precoding center angle between the RSC and the RSD, the difference in the transmission precoding angle width between the RSC and the RSD, and the difference in the transmission precoding phase between the RSC and the RSD. The indicator of difference in the precoding gain between the RSC and the RSD indicates to the receiver adjustments to be for receiving an RSC and an RSD with different precoding gains. Additionally, the indicator of the difference in the precoding phase for the RSC and the RSD indicates to the receiver adjustments to be used for receiving an RSC and an RSD with different phases. Also, the indicator of the difference in transmission precoding center angle between the RSC and the RSD indicates to the receiver adjustments for receiving an RSC and an RSD with different center angles. When the same precoding is used for RSCs of multiple control channels, the fourth bit field will be the same for the control channel. However, when different precoding is used for the different RSCs, the fourth bit field of the control channels will be different.

In block 216, the transmitter performs precoding on the first channel and the second channels, to form a first channel beam and second channel beams. The precoding for the RSC and for the RSD follow the precoding relationship indicated in the bit fields of the control channels. In some situations, there is no RSD, and the RSC is in an SQCL relationship with the data region. In other situations, the RSC and the RSD are in an SQCL relationship. In some situations, completely different precoding is used for the RSC and the RSD. In additional situations, the RSC and the RSD are in a SAP relationship. The precoding of the RSC and the precoding of the RSC may have a difference in transmission precoding gain, a difference in transmission center angle precoding, a difference in transmission precoding angle spread, and/or a difference in transmission precoding phase.

Finally, in block 218, the transmitter transmits the first channel beam and the second channels beam to a receiver.

Figure 8:
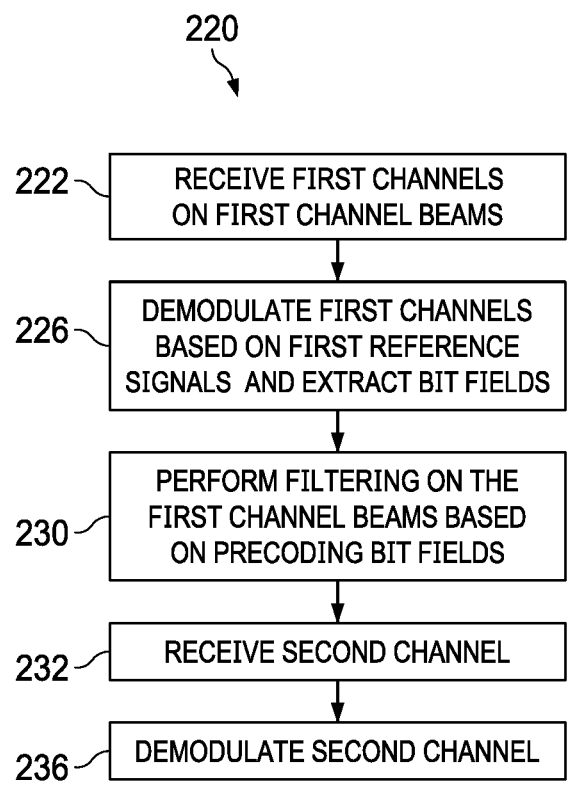
FIG. 8 illustrates a flowchart for an embodiment method of SAP beam coordination performed by a receiver.

FIG. 8 illustrates the flowchart 220 for an embodiment method of SAP beam coordination performed by a receiver. In one embodiment, the receiver is a UE, and downlink communication is being performed. Alternatively, the receiver is a communications controller, and uplink communication is being performed. In the block 222, the receiver receives one or more first channels on first channel beams. In one example, the first channels are data channels and the first channel beams are control channel beams. The receiver may receive one, two, three, or more control channels. The first channels may each contain an first reference signal, bit fields, and other information fields. In an embodiment, the first reference signal is an RSC. In other embodiments, the RSC is a CSI-RS, an SS, an SRS, a DMRS, or a data channel signal. The receiver extracts the first reference signals from the first channels. Also, the receiver ascertains the precoding for the first reference signals.

Then, in block 226, the receiver demodulates the first channels based on the first reference signals. When multiple control channels are present, each control channel may be demodulated using its corresponding RSC, and information, such as the bit fields, is extracted from the control channels. The first channels may include bit fields indicating the relationship between the precoding of the first reference signal and the precoding used for a second channel corresponding to the first channels. In an embodiment, the second channel is a data channel. In one embodiment, each control channel contains four bit fields. The first bit field indicates whether or not a second reference signal is present in the corresponding second channel. In one embodiment, the second channel is a data channel and the second reference signal is an RSD. In another embodiment, the RSD is a CSI-RS, an SS, an SRS, a DMRS, or a control channel signal. In some circumstances, additional signaling is included in the control channel, for example when the RSC is not the latest in time and the closest in frequency domain. In other circumstances, for example when the RSC is the latest in time and closest in frequency compared to the data channel, no extra signaling is in the control channel. When the first bit field indicates that the RSD is present, the RSD may be used in demodulating the data channel, possibly in combination with the RSC and other bit fields. The first bit field is the same for each control channel corresponding to the same data channel.

The second bit field indicates whether an RSD is in an SQCL relationship with the RSC. When different precoding is used for the RSC and the RSD, the receiver is instructed not to use the RSC to perform data channel demodulation. On the other hand, when the same precoding is used for the RSD and the RSC, the receiver is instructed to use both the RSC and the RSD to perform data channel demodulation. Additionally, when the RSC and the RSD are in an SQCL relationship, the receiver is instructed to use both the RSC and the RSD to perform control channel demodulation. When multiple communication fields correspond to the same data frame, the second bit field is the same for the multiple communications frames will be the same when either the same precoding is used for all RSCs and for the RSD, or none of the RSCs are in an SQCL relationship with the RSD. When some of the RSCs are in an SCQL relationship with the RSD and other of the RSCs are not in an SCQL relationship with the RSD, different values may be used for the second bit field for different control channels.

The third bit field indicates whether the RSD, if present, is in a SAP relationship with the RSC. When the RSD and the RSC are not in a SAP relationship, and they use entirely different precoding, the receiver is instructed to not use the RSC to perform data channel demodulation. On the other hand, when the RSC and the RSD are in a SAP relationship, the receiver is informed that it may use the RSC to perform data channel demodulation. When multiple communication fields correspond to the same data frame, the third bit field is the same for the multiple communications frames when either all RSCs are in SAP relationships with each other and with the RSD, or none of the RSCs are in SAP relationships with the RSD. When some of the RSCs are in a SAP relationships with the RSD and other of the RSCs are not in a SAP relationship with the RSD, different values may be use for the third bit field.

The fourth bit field provides detailed information on the relationship between the precoding of the RSC and the precoding of the RSD. The fourth bit field may including multiple parameters indicating the relationship between the precoding of the RSC and the precoding of the RSD, for example the difference in the transmission precoding gain between the RSC and the RSD, the difference in the transmission precoding center angle between the RSC and the RSD, the difference in the transmission precoding angle width between the RSC and the RSD, and the difference in the transmission precoding phase between the RSC and the RSD. When multiple communications channels correspond to the same data channel, the fourth bit field for the RSCs will be different when different precoding is used for different RSCs. On the other hand, when the same precoding is used for multiple RSCs, the fourth bit field will be the same for the control channels.

In block 230, the receiver performs filtering on the first channel beams, based on the first reference signals and the bit fields from the first channels. This filtering may be done to assist in receiving the second channels. When the bit fields of the control channels indicate that there is no RSD, or that the RSD is in a SQCL relationship with the RSCs, no filtering is performed, because the data field and RSD, if present, use the same precoding as the RSC, and the RSC is directly used for receiving the data channel. Additionally, when the bit fields indicate that there is no known relationship between the precoding of the RSC and the RSD, filtering is not performed, and the RSC is not used in receiving the data channel. However, when the control channel indicates that an RSC is in a SAP relationship with the RSD, filtering is performed on the RSC to assist in receiving the RSD. The RSC may be filtered to cover the angular spread of the RSD. Also, the RSC may be filtered to have the same precoding gain as the RSD. The AOA and/or the AOD of the RSD may be calculated based on the filtered version of the RSC. The RSD may also be filtered to assist in receiving the data channel. When multiple RSCs are received, filtering may be performed on the multiple RSCs, for example when the RSCs have a SAP relationship with each other and with the RSD.

In the block 232, the second channel, for example the data channel, is received. The AOA and/or the AOD of the second channel may be calculated based on the filtered version of the one or more first reference signals. Algorithms such as MSC, LCMV, and MVDR may be used for filtering. A filtered reference signal may also be used in determining the AOA and/or the AOD of the data channel. The filtered beams may be used to process the second channel and the second reference signal, for example an RSD, with accuracy.

Additionally, in the block 236, the data channel is demodulated using the second reference signal. The first reference signal may also be used to demodulate the channel. The data is extracted from the second channel for further use.

In some embodiments, the first signal is not a control channel signal, but another signal, for example a reference signal, such as a CSI-RS, a SS, a SRS, a DMRS, or a data channel signal. Also, in some embodiments, the second signal is not a data channel signal, but another signal, such as a reference signal, for example a CSI-RS, an SS, an SRS, a DMRS, or a control channel signal.

Figure 9:
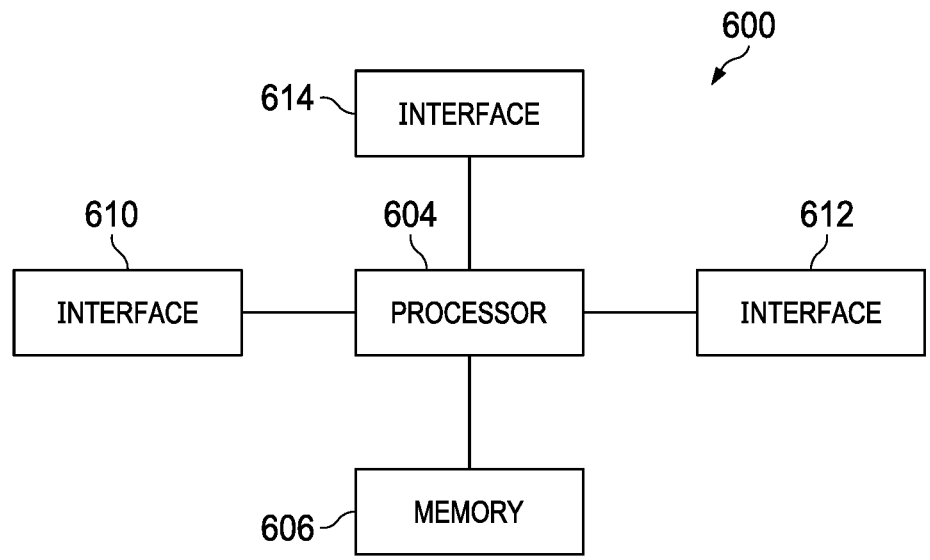
FIG. 9 illustrates a block diagram of an embodiment processing system.

FIG. 9 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 9. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 9, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 10:
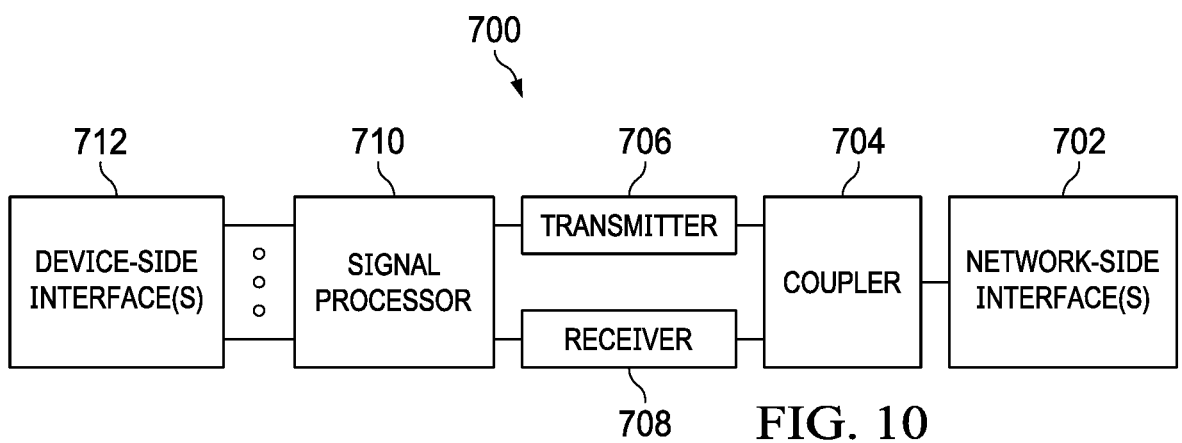
FIG. 10 illustrates a block diagram of an embodiment transceiver.

In some embodiments, one or more of the interfaces 610, 612, 614 connects the processing system 600 to a transceiver adapted to transmit and receive signaling over the telecommunications network. FIG. 10 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

What is claimed is:

1. A method implemented by a transmitter, the method comprising:
    transmitting, by the transmitter, at least a first transmission that includes a reference signal for control channel (RSC) and a second transmission that includes a reference signal for data channel (RSD) to a receiver, a transmission precoding phase of the RSC being different than a transmission precoding phase of the RSD, the first transmission indicating an amount of non-zero phase difference between the transmission precoding phase of the RSC and the transmission precoding phase of the RSD.

2. The method of claim 1, further comprising:
    transmitting a third transmission indicating a precoding relationship between the RSC and the RSD.

3. The method of claim 1, wherein the transmitter is a user equipment (UE) and the receiver is a communications controller.

4. The method of claim 1, wherein the transmitter is a communications controller and the receiver is a user equipment (UE).

5. The method of claim 1, wherein the first transmission further indicates an amount of non-zero angle difference in a transmission precoding center angle of the RSC and a transmission precoding center angle of the RSD.

6. The method of claim 1, wherein the first transmission further indicates an amount of non-zero angle difference in a transmission precoding spreading angle of the RSC and a transmission precoding spreading angle of the RSD.

7. The method of claim 1, wherein the first transmission further indicates an amount of non-zero gain difference in a transmission precoding gain of the RSC and a transmission precoding gain of the RSD.

8. A transmitter comprising:
    a processor; and
    a non-transitory computer readable storage medium storing programming for execution by the processor, the programming including instructions that cause the transmitter to:
        transmit at least a first transmission that includes a reference signal for control channel (RSC) and a second transmission that includes a reference signal for data channel (RSD) to a receiver, a transmission precoding phase of the RSC being different than a transmission precoding phase of the RSD, the first transmission indicating an amount of non-zero phase difference between the transmission precoding phase of the RSC and the transmission precoding phase of the RSD.

9. The transmitter of claim 8, wherein the programming further includes instructions that cause the transmitter to:

transmit a third transmission indicating a precoding relationship between the RSC and the RSD.

10. The transmitter of claim 8, wherein the transmitter is a user equipment (UE) and the receiver is a communications controller.

11. The transmitter of claim 8, wherein the transmitter is a communications controller and the receiver is a user equipment (UE).

12. The transmitter of claim 8, wherein the first transmission further indicates an amount of non-zero angle difference in a transmission precoding center angle of the RSC and a transmission precoding center angle of the RSD.

13. The transmitter of claim 8, wherein the first transmission further indicates an amount of non-zero angle difference in a transmission precoding spreading angle of the RSC and a transmission precoding spreading angle of the RSD.

14. The transmitter of claim 8, wherein the first transmission further indicates an amount non-zero gain difference in a transmission precoding gain of the RSC and a transmission precoding gain of the RSD.

15. A method implemented by a receiver, the method comprising:
receiving, by the receiver, at least a first transmission that includes a reference signal for control channel (RSC) and a second transmission that includes a reference signal for data channel (RSD) from a transmitter, a transmission precoding phase of the RSC being different than a transmission precoding phase of the RSD, the first transmission indicating an amount of non-zero phase difference between the transmission precoding phase of the RSC and the transmission precoding phase of the RSD; and
processing, by the receiver, the RSC and the RSD in accordance with the the amount of non-zero phase difference between the transmission precoding phase of the RSC and the transmission precoding phase of the RSD.

16. The method of claim 15, further comprising:
receiving a third transmission indicating a precoding relationship between the RSC and the RSD.

17. The method of claim 15, wherein the transmitter is a user equipment (UE) and the receiver is a communications controller.

18. The method of claim 15, wherein the transmitter is a communications controller and the receiver is a user equipment (UE).

19. The method of claim 15, wherein the first transmission further indicates an amount of non-zero angle difference in a transmission precoding center angle of the RSC and a transmission precoding center angle of the RSD.

20. The method of claim 15, wherein the first transmission further indicates an amount of non-zero angle difference in a transmission precoding spreading angle of the RSC and a transmission precoding spreading angle of the RSD.

21. The method of claim 15, wherein the first transmission further indicates an amount of non-zero gain difference in a transmission precoding gain of the RSC and a transmission precoding gain of the RSD.

22. A receiver comprising:
a processor; and
a non-transitory computer readable storage medium storing programming for execution by the processor, the programming including instructions that cause the receiver to:
receive at least a first transmission that includes a reference signal for control channel (RSC) and a second transmission that includes a reference signal for data channel (RSD) from a transmitter, a transmission precoding phase of the RSC being different than a transmission precoding phase of the RSD, the first transmission indicating an amount of non-zero phase difference between the transmission precoding phase of the RSC and the transmission precoding phase of the RSD; and
process the RSC and the RSD in accordance with the amount of non-zero phase difference between the transmission precoding phase of the RSC and the transmission precoding phase of the RSD.

23. The receiver of claim 22, wherein the programming further includes instructions that cause the receiver to:
receiver a third transmission indicating a precoding relationship between the RSC and the RSD.

24. The receiver of claim 22, wherein the transmitter is a user equipment (UE) and the receiver is a communications controller.

25. The receiver of claim 22, wherein the transmitter is a communications controller and the receiver is a user equipment (UE).

26. The receiver of claim 22, wherein the first transmission further indicates an amount of non-zero angle difference in a transmission precoding center angle of the RSC and a transmission precoding center angle of the RSD.

27. The receiver of claim 22, wherein the first transmission further indicates an amount of non-zero angle difference in a transmission precoding spreading angle of the RSC and a transmission precoding spreading angle of the RSD.

28. The receiver of claim 22, wherein the first transmission further indicates an amount of non-zero gain difference in a transmission precoding gain of the RSC and a transmission precoding gain of the RSD.

* * * * *